United States Patent
Lee et al.

(10) Patent No.: US 6,317,392 B1
(45) Date of Patent: Nov. 13, 2001

(54) OPTICAL DISK WITH A NON-VOLATILE MEMORY, OPTICAL DISK UNIT, AND CONTROL METHOD FOR THE OPTICAL DISK UNIT

(75) Inventors: Sang-Jin Lee, Kyunggi-do; Yong-Sik Park, Seoul, both of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/084,305

(22) Filed: May 26, 1998

(30) Foreign Application Priority Data

May 27, 1997 (KR) .................................................. 97-20832

(51) Int. Cl.[7] .................................................... G11B 17/22
(52) U.S. Cl. .......................................... 369/32; 369/275.3
(58) Field of Search ............................ 369/14, 32, 44.29, 369/44.36, 53.11, 53.2, 275.3, 47.36, 275.1, 275.2, 13

(56) References Cited

U.S. PATENT DOCUMENTS

| | | |
|---|---|---|
| 5,023,854 | 6/1991 | Satoh et al. . |
| 5,119,363 | 6/1992 | Satoh et al. . |
| 5,138,598 | 8/1992 | Sako et al. . |
| 5,138,599 | 8/1992 | Fukushima et al. . |
| 5,144,608 | 9/1992 | Sakagami et al. . |
| 5,173,886 | 12/1992 | Satoh et al. . |
| 5,214,627 | 5/1993 | Nakashima et al. . |
| 5,247,494 | 9/1993 | Ohno et al. . |
| 5,321,673 | 6/1994 | Okazaki . |
| 5,432,762 | 7/1995 | Kubo et al. . |
| 5,537,387 * | 7/1996 | Ando et al. . |
| 5,703,867 | 12/1997 | Miyauchi et al. . |
| 5,708,653 | 1/1998 | Okada et al. . |
| 5,732,058 | 3/1998 | Iwamura et al. . |
| 5,812,519 * | 9/1998 | Kawamura et al. ............... 369/275.1 |
| 5,815,333 * | 9/1998 | Yamamoto et al. .................... 360/60 |
| 5,825,728 * | 10/1998 | Yoshimoto et al. ................... 369/32 |
| 5,835,479 * | 11/1998 | Miyagawa et al. ............... 369/275.2 |

* cited by examiner

*Primary Examiner*—Ali Neyzari
(74) *Attorney, Agent, or Firm*—Robert E. Bushnell, Esq.

(57) ABSTRACT

An optical disk is provided including a read only memory region formed on one surface of the optical disk and recorded with information, a non-volatile memory formed on the other surface of the optical disk opposite to the surface formed with the read only memory region, a mark formed on the surface of the optical disk where the non-volatile memory is formed, and one or more dummy memories arranged on the optical disk in such a manner that the center of weight of the optical disk is positioned at the center of the optical disk. Also, provided is an optical disk unit adapted to use the optical disk, which includes a non-volatile memory pickup unit for reading data recorded on the non-volatile memory of the optical disk and writing data onto the non-volatile memory. The optical disk unit is controlled by applying a write or read command to the non-volatile memory, sensing the mark on the optical disk, stopping the optical disk, electrically connecting the pickup to the non-volatile memory, executing a data reading or writing operation for the non-volatile memory, and electrically disconnecting the pickup from the non-volatile memory. Additionally, there is further provided an optical disk unit for a cartridge type optical disk, with at least one non-volatile memory formed on one surface of the cartridge.

5 Claims, 8 Drawing Sheets

Sec A-A'

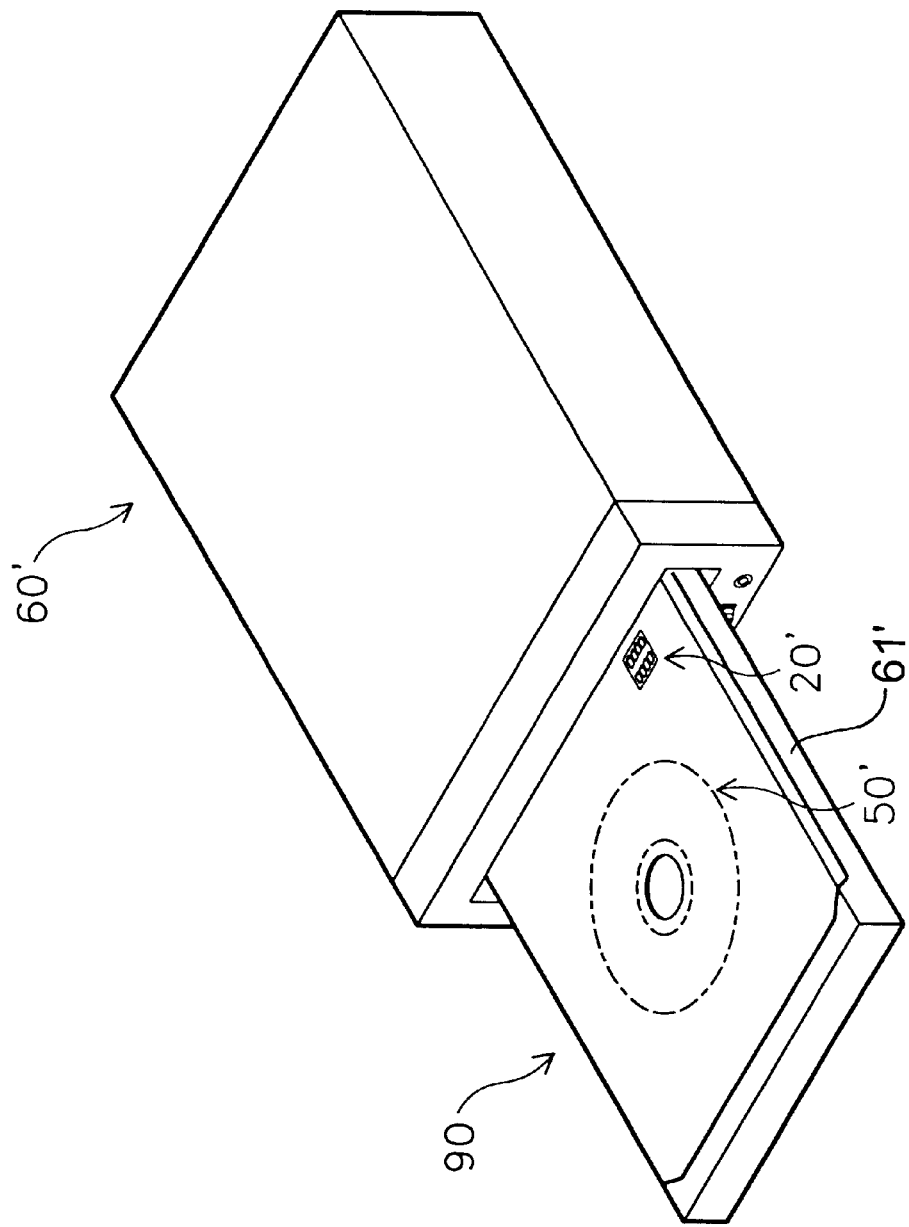

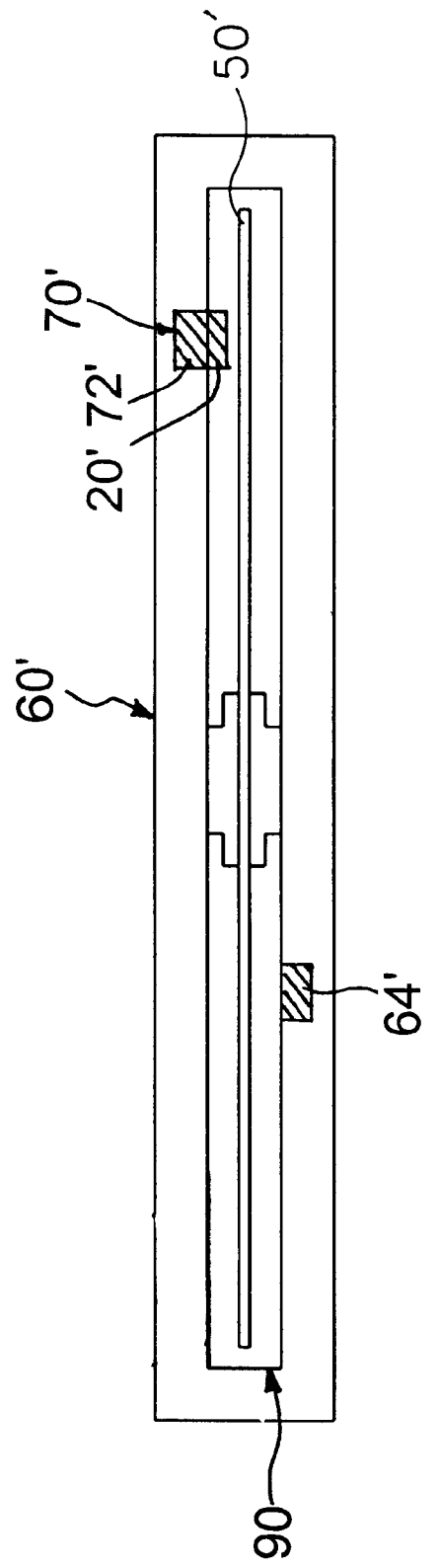

OPTICAL DISK WITH A NON-VOLATILE MEMORY, OPTICAL DISK UNIT, AND CONTROL METHOD FOR THE OPTICAL DISK UNIT

CLAIM OF PRIORITY

This application makes reference to, incorporates the same herein, and claims all benefits accruing under 35 U.S.C. §119 from an application entitled Optical Disk Provided with Non-Volatile Memory, Optical Disk Unit Using the Optical Disk, and Control Method for the Optical Disk Unit earlier filed in the Korean Industrial Property Office on May 27, 1997, and there duly assigned Ser. No. 97-20832 by that Office.

BACKGROUND OF THE INVENTION

1. Field of the Invention

The present invention relates to an optical disk provided with a non-volatile memory, an optical disk unit using such an optical disk and a control method for the optical disk unit, and more particularly to an optical disk provided with a non-volatile memory enabling writing of data onto the optical disk adapted only for a reproduction of data recorded thereon.

2. Description of the Related Art

Optical disk techniques are well known in which writing of data is carried out in a non-contact manner using a laser beam. In order to achieve data writing at a high speed and re-writing of data, developments of techniques for writing data at a high density are being made in association with optical disks. For example, short wave lasers and data writing/reading techniques for optical disks have been developed. Also, a variety of optical disks having various functions and capacities have been proposed by virtue of developments in digital techniques.

For instance, compact disks (CD's) and digital video disks (DVD's) have been proposed which have a high data writing capacity and a data re-writing function. However, such optical disks are expensive. Moreover, optical disk units adapted to use such optical disks are expensive. For this reason, read only optical disks such as compact disk read only memories (CD-ROM's) and digital video disc read only memories (DVD-ROM's) are presently widely used.

Storage media such as CD-ROM's and DVD-ROM's are configured to read data recorded when manufactured. Where such storage media are recorded with a computer program for recording specific information such as user information, passwords or scores of games, it is necessary to record the information in a separate auxiliary storage unit, having a data writing function, such as a hard disk drive. In this case, accordingly, a separate setup procedure should be executed upon using a storage medium such as CD-ROM and DVD-ROM in order to connect the auxiliary storage unit to the storage medium, thereby recording necessary information onto the auxiliary storage unit.

U.S. Pat. No. 5,023,854 to Satoh et al. entitled Disc Having a Data Read-Only Area and a Data Recording Arm and a Recording Reproducing System Therefor, disclose a read only type optical disc, and disc drive apparatus for reading/additionally writing data into the disc. The disc is disclosed as having a recording material formed in all of the tracks by which data can be additionally recorded on the disc, with the optical disc having a plurality of sectors forming a data read-only area and a write/read area. It is disclosed that each area has track sectors each having a sector identifier portion in which address information is recorded and a data field portion to record data, with data-field identification flags indicative of the read-only area and the write/read area are recorded in the respective identifier portions. Dummy sectors are also disclosed.

U.S. Pat. No. 5,119,363 to Satoh et al. entitled Optical Disk Having an Index Mark, disclose an optical recording disk having groove-like guide tracks, a rotation index mark being provided to indicate a rotation starting point where the rotation index mark is constructed of a grooved-like phase structure. It is disclosed that the rotation index mark can be formed in a track which is located separated from the information recording tracks, and can be detected optically without using a laser light beam. It is disclosed that the rotation index mark is used to control the rotation of the disk as well as a writing and reading operation of an optical disk recording/reproducing apparatus so that various information, such as video signals, can be accurately recorded and reproduced. In the case of recording digital signals, it is disclosed that the guide tracks can be divided into a plurality of sector regions, and sector index marks corresponding to respective sector regions can also be formed together with the rotation index mark. Also, it is disclosed that an address index mark indicative of the position of a track address region radially formed in the guide tracks can also be added.

U.S. Pat. No. 5,138,598 to Sako et al. entitled Optical Disk Having Relatively Wide Ram Tracks and Relatively Narrow Rom Tracks, disclose a record medium having a pre-formed recording track with a recordable area on the recording track in which data is recorded and an area on the recording track used exclusively for reproduction in which data is pre-recorded by displacing the track in the track width direction and in which the track width of the data recordable area is wider than that of the area used exclusively for reproduction.

U.S. Pat. No. 5,138,599 to Fukushima et al. entitled Information Recording Medium Having Dummy Tracks and Information Recording and Reproducing Apparatus, disclose a disk-shaped information recording medium using an MCAV format, wherein a plurality of tracks are divided in a radial direction of the disk to form plural zones, at the boundary of which a dummy track area is formed by dummy tracks on which a discrimination signal is recorded.

U.S. Pat. No. 5,144,608 to Sakagami et al. entitled Apparatus for Recording and Reproducing Information on and from a Recording Medium Having a Reference Position Mark, disclose an information recording-reproducing apparatus including a light source for emitting a light beam, a lens device for imaging the light beam from the light source on an optical information recording medium, a photodetector for receiving light from the recording medium and for outputting a plurality of types of signals, a detector for detecting a mark indicative of a reference position on the recording medium on the basis of a corresponding signal from the photodetector and for outputting a signal, a device for initiating auto-tracking on the basis of the signal from the detector, a tracking actuator for moving a lens device, and a device for controlling the tracking actuator to start recording and reproduction of information from a predetermined position on the recording medium after the auto-tracking has been initiated.

U.S. Pat. No. 5,173,886 to Satoh et al. entitled Composite Optical Disc Having Both a Data Read-Only Area and a Data Rewritable Area, and a Recording/Reproducing System for Use Therewith, disclose a composite read-only and rewritable type optical disc, and a disc drive apparatus for reading/writing data into the disc. It is disclosed that the optical disc has a plurality of sectors forming a data read-only area and a write/read area, with the disc including a recording film formed over its entire surface by which data can be recorded on the disc. It is also disclosed that each area has track sectors each having a sector identifier portion in which address information is recorded and a data field portion to record data, with data-field identification flags indicative of the read-only area and the write/read area being recorded in the respective identifier portions. It is disclosed that on reading or writing this optical disc, the data field identification flag is detected to identify the kind of related area, i.e., whether it is a read-only area or a write/read area. Dummy sectors are also disclosed.

U.S. Pat. No. 5,214,627 to Nakashima et al. entitled Optical Disk Having Read-Exclusive and Write-Enable Regions, disclose an optical disk provided with read-exclusive regions where previously recorded information can be read, and with write-enable regions where information can be written. It is disclosed that information not desired to be rewritten can be recorded on the read-exclusive region, with the write-enable regions being open to users to freely add information thereto and to re-write information recorded.

U.S. Pat. No. 5,247,494 to Ohno et al. entitled Method for Recording and Reproducing Information on and from an Optical Disk Having a Read-Only Recorded Zone and a Writable and Readable Zone Using a Spot Laser Light, disclose an optical disk provided with a pre-recorded ROM zone and at least one of the write-once zone and an erasable-writable zone. It is disclosed that two types of information are pre-recorded in the ROM zone, including first information for controlling reading from and writing to the non-ROM zone or zones, and second information for use in data information production. It is disclosed that information is recorded and read as localized differences in reflectivity on the disk. It is disclosed that data information is created using second information read from the ROM zone, and is written to and reproduced from the non-ROM zone or zones.

U.S. Pat. No. 5,321,673 to Okazaki entitled Partial Rom Type Optical Disk and its Recording and Reproducing Apparatus, discloses an optical disk provided with a ROM area for reproduction only, in which information for reproduction only and first retrieval information for retrieving the information for reproduction only are recorded in embossed shape and a rewritable area in which information can be additionally recorded or rewritten, wherein on the basis of each of a plurality of additionally recording and rewriting logical specifications of respective appliances utilizing the optical disk, the first retrieval information is converted into second retrieval information, wherein the second retrieval information corresponds to at least one of the appliances and is recorded in the rewritable area together with third retrieval information for the additionally recordable and rewritable information so as to be additionally recordable or rewritable.

U.S. Pat. No. 5,432,762 to Kubo et al. entitled Detection Apparatus for Detecting Sector Marks of Optical Disk and Optical Disk Access Apparatus, disclose a sector mark detection apparatus which detects a sector mark added to an arbitrary sector of an optical disk when seeking the arbitrary sector, where the optical disk has a predetermined recording format in which a predetermined number of sectors are arranged on the optical disk. It is disclosed a sector mark detection apparatus is provided with a gate signal generating circuit for generating a predetermined number of gate signals at predetermined intervals based on timings between pulse signals which are read from the optical disk, a mark length generating circuit for generating mark length data related to lengths of the sector marks from the read pulse signals based on the timings, a counter circuit for measuring widths of the gate signals by counting at a predetermined frequency and for outputting counted values, a matching circuit for comparing the counted values and match data and for outputting a matched result, and a judging circuit for judging the sector mark of the arbitrary sector based on the mark length data and the matching result.

U.S. Pat. No. 5,703,867 to Miyauchi et al. entitled Optical Recording Medium Having a Dummy Area at Leading and/or Trailing Positions of Recording Area, disclose a recording medium having a dummy signal area on at least one side of a recording area being used and information being recorded with a dummy signal added to at least one of the leading and trailing sides in the recorded information signal.

U.S. Pat. No. 5,708,653 to Okada et al. entitled Single-Substrate Multi-Layer Optical Disk for Read-Only Storage and Phase Change Rewritable Storage, disclose an optical disk including a transparent rigid substrate, a phase change rewritable optical recording medium formed on the transparent rigid substrate, a transparent spacer formed on the phase change rewritable optical recording medium and having a grooved surface for storing information, and a reflecting layer formed on the grooved surface of the transparent spacer, with the grooved surface of the transparent spacer and the reflecting layer forming a read-only recording medium.

U.S. Pat. No. 5,732,058 to Iwamura et al. entitled Optical Disk Cartridge and an Optical Disk Drive Using The Same, disclose an optical disk cartridge including a cartridge body formed with an opening at an edge thereof such that an optical disk can be taken out and returned from and to the optical disk cartridge. It is disclosed that the opening is closed by a cover lid that is formed as an integral body of the cartridge body.

SUMMARY OF THE INVENTION

Therefore, an object of the invention is to solve the above mentioned problems involved in the contemporary practice in the art and to not only provide an optical disk provided with a new type non-volatile memory enabling writing of data onto the optical disk which has the form of a CD-ROM or DVD-ROM for reading of data recorded thereon, but also to provide an optical disk unit using such an optical disk and a method for controlling such an optical disk unit.

In accordance with one aspect, the present invention provides an optical disk comprising a read only memory region formed on one surface of the optical disk for recorded information, the read only memory region having a data read function, and at least one non-volatile memory formed on the other surface of the optical disk opposite to the surface formed with the read only memory region, the non-volatile memory having a data read/write function.

The optical disk comprises at least one mark formed on the surface of the optical disk where the non-volatile memory is formed, the mark corresponding to the non-volatile memory and serving to identify the position of the corresponding non-volatile memory, and at least one dummy memory arranged on the optical disk in such a manner that the center of weight of the optical disk is positioned at a rotation center of the optical disk. The non-volatile memory is radially spaced apart from the center of the optical disk by a desired distance. The mark is disposed near a peripheral edge of the optical disk in such a manner that it is arranged on an axis which passes through both the non-volatile memory and the center of the optical disk. The non-volatile memory comprises an electrically erasable and programmable read only memory.

In accordance with another aspect, the present invention provides a storage medium comprising an optical disk, a cartridge for receiving the optical disk therein, the cartridge being loaded in an optical disk unit for using the optical disk, and at least one non-volatile memory formed on one surface of the cartridge, the non-volatile memory having a data read/write function. The non-volatile memory comprises an electrically erasable and programmable read only memory.

In accordance with further aspect, the present invention provides an optical disk unit for using an optical disk provided with a non-volatile memory, comprising an optical pickup unit for reproducing data recorded on a read only memory region of the optical disk under the condition in which the optical disk is loaded in the optical disk unit, and a non-volatile memory pickup unit for reading data recorded on the non-volatile memory of the optical disk loaded in the optical disk unit and writing data onto the non-volatile memory.

The non-volatile memory pickup unit comprises a control unit, a drive unit adapted to generate a drive force, a pickup receiving the drive force from the drive unit, and a sensing unit for sensing a mark formed on the optical disk to determine the position of the non-volatile memory.

In accordance with an additional aspect, the present invention provides a method for controlling an optical disk unit for using an optical disk provided with a non-volatile memory, comprising the steps of aligning an electrode of a pickup included in the optical disk unit with an electrode of the non-volatile memory, electrically connecting the electrode of the pickup to the electrode of the non-volatile memory, executing at least one of a data reading operation and data writing operation for the non-volatile memory, and electrically disconnecting the pickup from the non-volatile memory.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 10a and 10b are perspective views illustrating an optical disk unit using a cartridge type optical disk according to another embodiment of the present invention.

DESCRIPTION OF THE PREFERRED EMBODIMENTS

Figure 1:
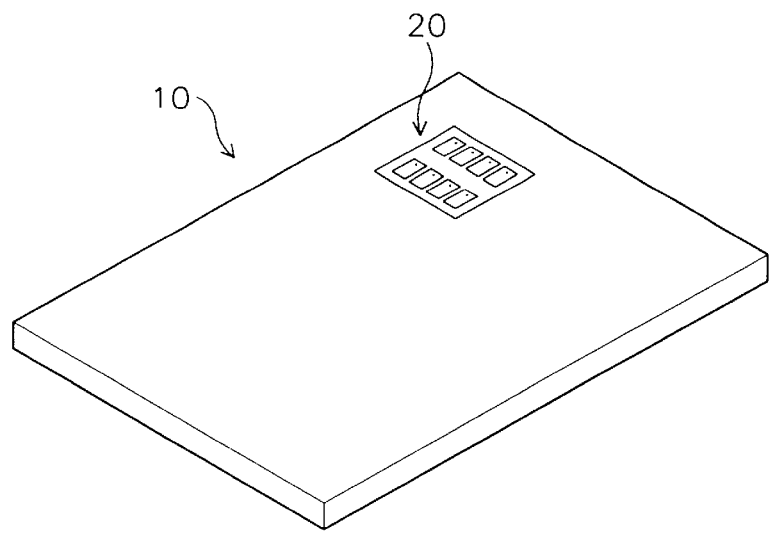
FIG. 1 is a perspective view illustrating an identification card in which an electrically erasable and programmable read only memory (EEPROM) is incorporated.

Embodiments of the present invention will be described hereinafter in detail in conjunction with FIGS. 1 through 10b. In FIGS. 1 through 10b, elements having the same function are denoted by the same reference numeral.

Figure 2:
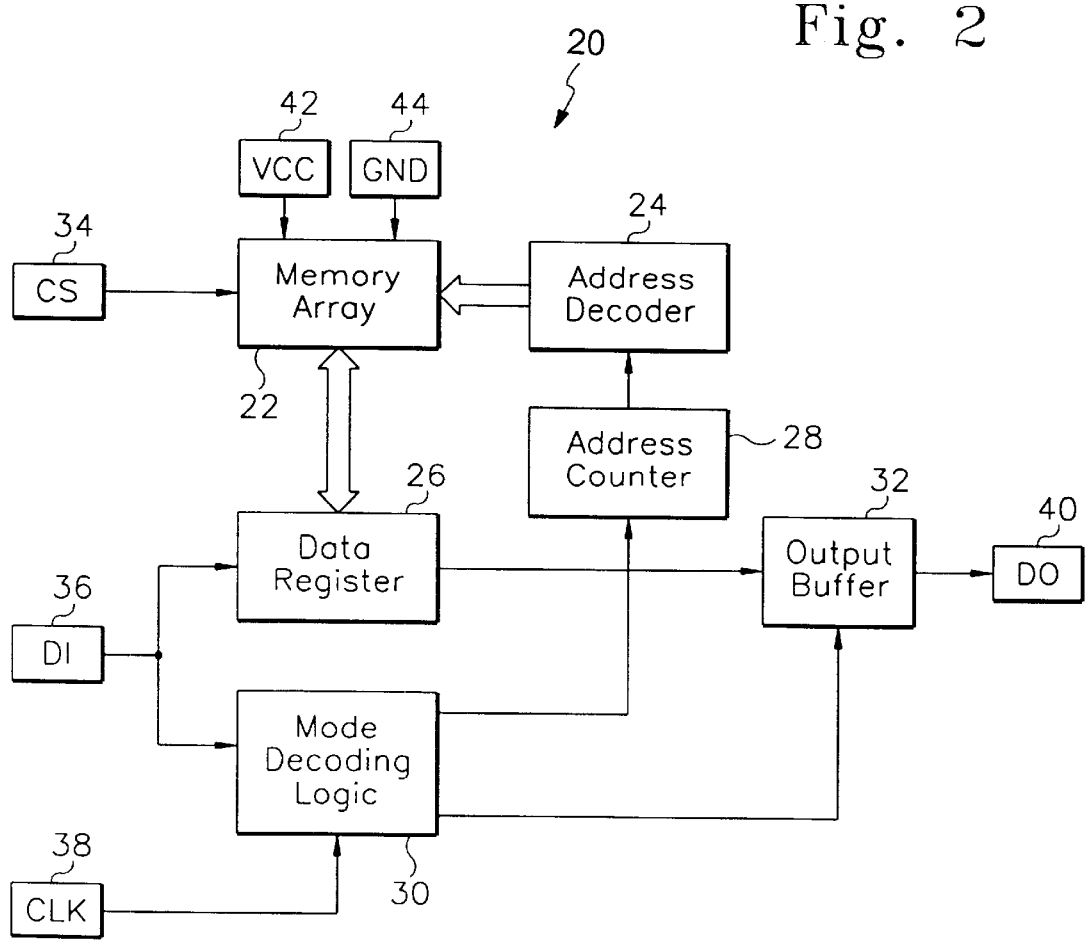
FIG. 2 is a block diagram illustrating the circuit configuration of a general EEPROM.
Figure 3:
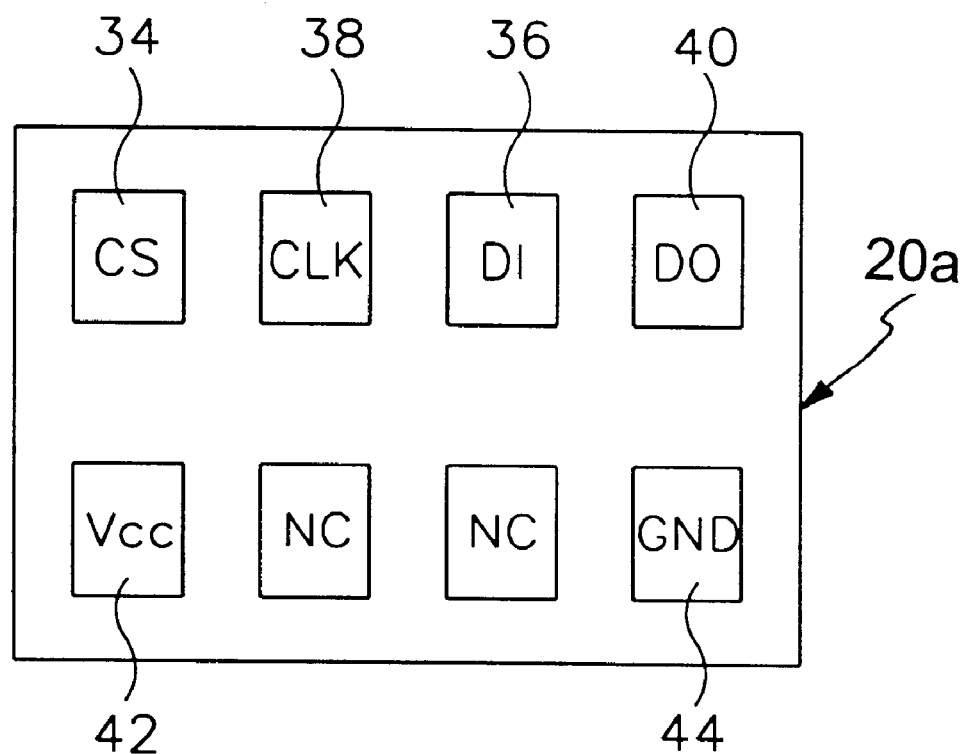
FIG. 3 is a plan view illustrating the terminal configuration of a unit in which an EEPROM is packaged.

Referring to FIGS. 1 through 3, an electrically erasable and programmable ROM (EEPROM) 20, which is a non-volatile memory that can be incorporated in an optical disk according to the present invention, is illustrated. FIG. 1 illustrates the case in which the EEPROM 20 is incorporated in an identification card 10. In this case, convenience in use is obtained in that relatively simple data such as personal information can be written in the EEPROM 20. Reading of the written data and re-writing of new data can be achieved by a separate data input/output unit. Accordingly, there is provided great convenience in changing and maintaining input information.

As shown in FIG. 2, the EEPROM 20 has a circuit configuration capable of re-inputting data and reproducing the input data using a data input/output unit. That is, the EEPROM 20 includes a memory array 22 for storing data therein, a plurality of controllers including address decoder 24, data register 26, address counter 28, mode decoding logic 30 and output buffer 32 for controlling inputting/ outputting of a variety of corresponding data, respectively, and a plurality of terminals CS 34, DI 36, CLK 38, DO 40, VCC 42 and GND 44 for providing supply voltage to various circuit elements of the EEPROM 20 while electrically connecting those circuit elements to an external unit, thereby transferring electrical signals from the circuit elements to the external unit. The EEPROM 20 having the above mentioned circuit configuration has a terminal configuration as shown in FIG. 3.

Figure 4:
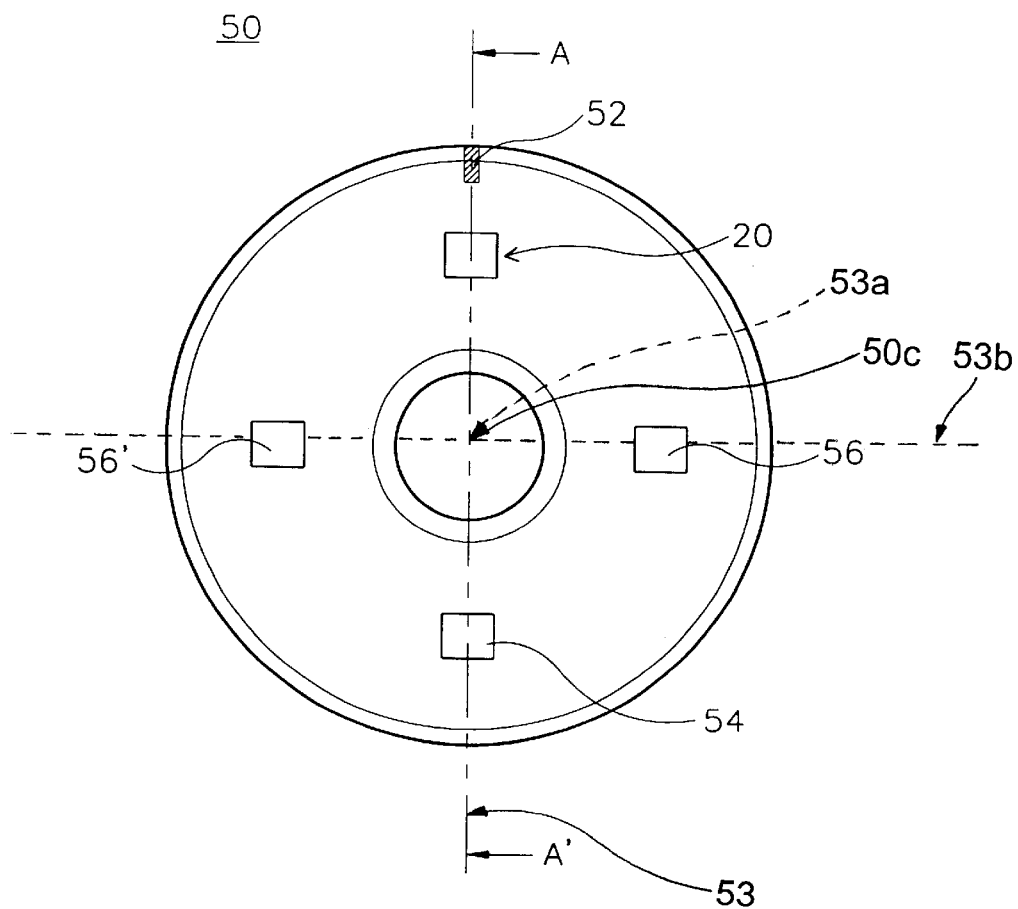
FIG. 4 is a plan view illustrating an optical disk provided with a non-volatile memory in accordance with an embodiment of the present invention.
Figure 5:
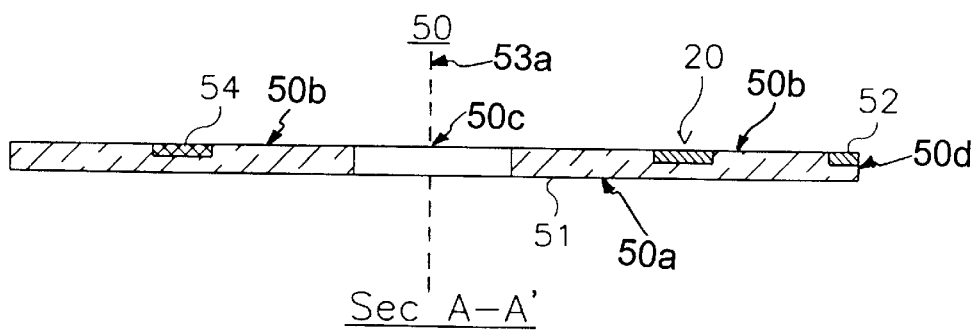
FIG. 5 is a cross-sectional view taken along the line A–A' of FIG. 4.

Referring to FIGS. 4 and 5, an optical disk provided with a non-volatile memory is illustrated, in which an EEPROM having the above mentioned configuration is incorporated as the non-volatile memory in accordance with an embodiment of the present invention. As shown in FIGS. 4 and 5, the optical disk, which is denoted by the reference numeral 50, has a read only memory region 51 formed on one surface 50a of the optical disk 50, and at least one non-volatile memory, namely, EEPROM 20, formed on the other surface 50b of the optical disk 50 opposite to the surface 50a formed with the read only memory region 51. The EEPROM 20 is configured to enable writing of data thereon and reading of data therefrom. The EEPROM 20 is radially spaced apart from the center 50c of the optical disk 50 by a desired distance. The optical disk 50 also has a mark 52 formed on the surface 50b of the optical disk 50, where the EEPROM 20 is formed, near the peripheral edge 50d of the optical disk 50 in such a manner that it is arranged on an axis 53 which passes through both the EEPROM 20 and the center 50c of the optical disk 50. The optical disk 50 further has a first dummy memory 54 and a pair of second dummy memories 56 and 56'. All the dummy memories 54, 56 and 56' are formed on the surface 50b of the optical disk 50 where the EEPROM 20 is formed. The first dummy memory 54 is arranged on the axis 53, which passes through both the EEPROM 20 and the center 50c of the optical disk 50, in such a manner that it is symmetric with the EEPROM 20 with respect to an axis 53a orthogonal to the former axis 53, the axis 53a passing through the center 50c and orthogonal to optical disk 50 as illustrated in FIGS. 4–5. The second dummy memories 56 and 56' are arranged in such a manner that when the optical disk 50 rotates, the center of weight thereof is positioned at the rotation center in the area of center 50c of the optical disk 50. Preferably, the second dummy memories 56 and 56' are arranged on an axis 53b orthogonal to the axis 53 passing through both the EEPROM 20 and the center 50c of the optical disk 50, the second dummy memories 56 and 56' being symmetrically disposed on the optical disk 50 with respect to axis 53a. By such an arrangement, the optical disk 50 can rotate without any rolling. In other words, the positions of the EEPROM 20, the first and second dummy memories 54, 56 and 56', and mark 52 are appropriately determined so that the center of weight thereof is positioned at the rotation center in the area of center 50c of the optical disk 50, thereby enabling the optical disk 50 to rotate without any rolling. The mark 52 is used to find the position of the non-volatile memory, such as EEPROM 20, on the optical disk 50 in an optical disk unit upon writing data onto the optical disk 50 and reading the written data from the optical disk 50.

Figure 6:
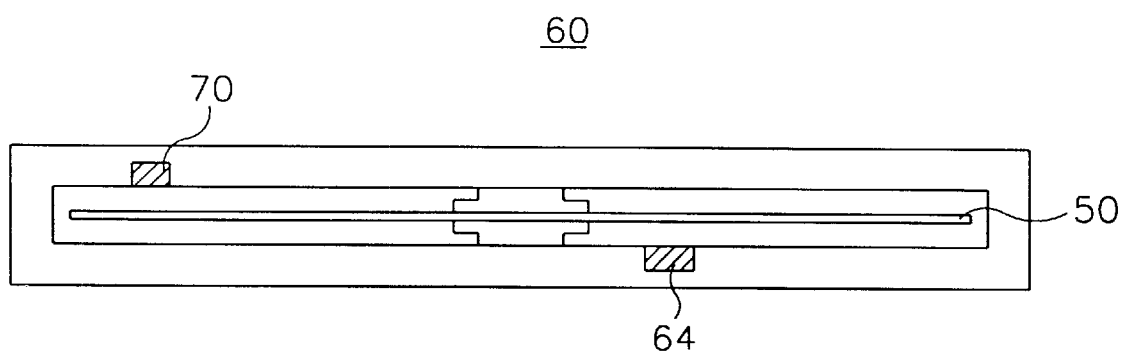
FIG. 6 is a cross-sectional view schematically illustrating an optical disk unit for using the optical disk of FIG. 4 according to the present invention.

Returning to FIG. 6, FIG. 6 illustrates an optical disk unit 60 for using the optical disk 50, such as a CD-ROM or DVD-ROM, provided with a non-volatile memory, namely, the EEPROM 20, according to an embodiment of the present invention. As shown in FIG. 6, the optical disk unit 60 includes an optical pickup unit 64 for reproducing data recorded on the read only memory region 51 of the optical disk 50 under the condition in which the optical disk 50 is loaded in the optical disk unit 60, and a non-volatile memory pickup unit 70 for reading data recorded on the non-volatile memory of the optical disk 50 loaded in the optical disk unit 60 and writing data onto the non-volatile memory. The optical pickup unit 64 of the optical disk unit 60 includes an optical pickup adapted to read data from the read only memory region 51 of the optical disk 50 using a laser beam, and an RF amplification IC adapted to convert an output from the pickup in the form of current into the form of voltage while amplifying the converted output, and a servo IC adapted to use focus and tracking error signals output from the RF amplification IC. The optical pickup unit 64 also includes a disk motor, a feeding motor, and a system controller.

Figure 7:
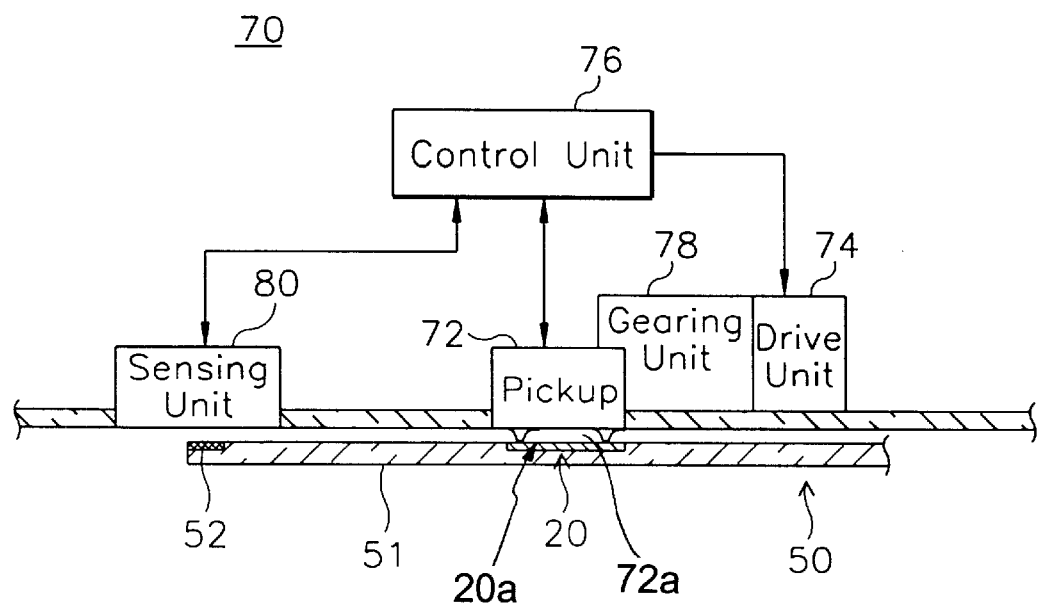
FIG. 7 is a block diagram illustrating a circuit configuration of the optical disk unit for using the non-volatile memory of the optical disk of FIG. 4 according to the present invention.

In order to read data recorded on the non-volatile memory, such as EEPROM 20, of the optical disk 50, as shown in FIG. 7, the non-volatile memory pickup unit 70 of FIG. 6 includes a control unit 76, a pickup 72 contacting the non-volatile memory, such as the EEPROM 20, a drive unit 74 for generating a drive force for the pickup 72, a gearing unit 78 for transmitting a drive force generated from the drive unit 74 to the pickup 72, thereby driving the pickup 72, and a sensing unit 80 for sensing the mark 52. Where the non-volatile memory has the form of an EEPROM, as in the above mentioned case, the pickup 72 comprises an electrode 72a having the form of a leaf spring, in order to electrically write data onto the EEPROM, such as the EEPROM 20.

Now, the operation of the optical disk unit 60, which is adapted to use the optical disk 50 having the non-volatile memory according to the present invention, will be described. First, supply voltage is applied to the optical disk unit 60. Thereafter, the optical disk 50 is loaded in the optical disk unit 60. Where data written on the read only memory region 51 of the optical disk 50 is to be read, the optical pickup unit 64 operates, thereby reading data from the read only memory region 51 of the optical disk 50. Where a write or read command is subsequently generated to write data onto the EEPROM 20 or to read data from the EEPROM 20, the operation of the optical pickup unit 64 is stopped while the non-volatile memory pickup unit 70 begins to operate. That is, the sensing unit 80 of the non-volatile memory pickup unit 70 senses the mark 52 formed on the optical disk 50 and stops the optical disk 50 at a position where the pickup 72 is electrically connectable to the EEPROM 20. The pickup 72 is then electrically connected to the EEPROM 20 after moving appropriately into position. The movement of the pickup 72 is carried out by the drive unit 74 and gearing unit 78. In this state, the EEPROM 20 is controlled by the control unit 76. After writing of data onto the EEPROM 20 or reading of data from the EEPROM 20 is completed, the pickup 72 moves to its original position, so that it is electrically disconnected from the EEPROM 20. Thus, the use of the EEPROM 20 is completed.

Figure 8:
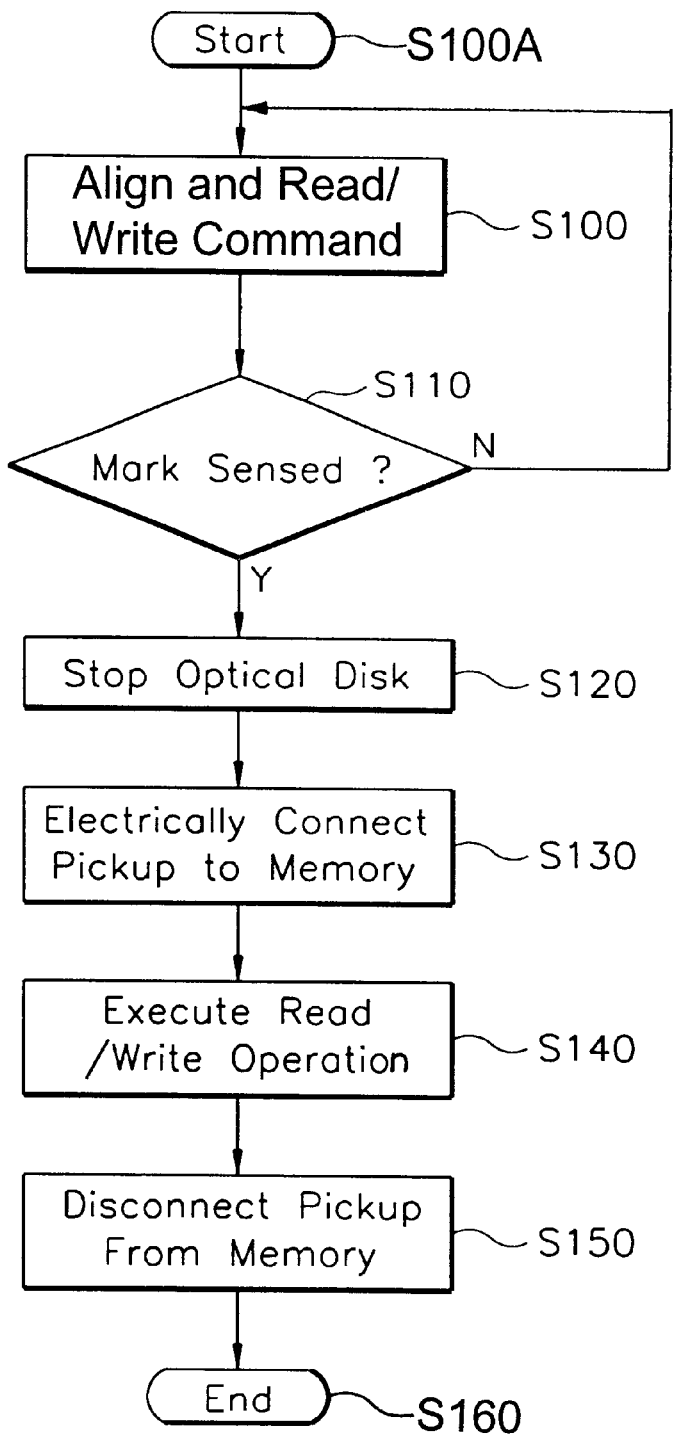
FIG. 8 is a flow chart illustrating a method for controlling the optical disk unit of FIGS. 6–7 using the non-volatile memory of the optical disk in accordance with the present invention.

The above operation of the optical disk unit 60 will now be described in detail, in conjunction with FIG. 8. FIG. 8 illustrates a method for controlling the optical disk unit 60 upon reading data from the non-volatile memory, such as EEPROM 20, of the above mentioned optical disk 50 or writing data onto the non-volatile memory in accordance with the present invention. As shown in FIG. 8 the method starts step S100A. In step S100 the control method includes aligning the electrode 72a of the pickup 72 with the electrode 20a of the non-volatile memory 20 (FIGS. 3 and 7), namely, the aligning step proceeding by generating a write or read command.

The method then proceeds to step S110. In step S110 it is determined if mark 52 is sensed on the optical disk 50, such as by being sensed by sensing unit 80 (FIG. 7). If the mark is not sensed, the method returns to step S100 to continue the aligning step. If the mark 52 is sensed in step S110, the method proceeds to step S120 to stop the optical disk 50. The method then proceeds to step S130 to electrically connect the pickup 72 to the non-volatile memory, such as EEPROM 20. The method then proceeds to step S140 to execute at least one of a data reading operation and data writing operation for the non-volatile memory, such as EEPROM 20. The method then proceeds to step S150 to electrically disconnect the pickup 72 from the non-volatile memory, such as EEPROM 20. The method then ends at step S160.

Figure 9:
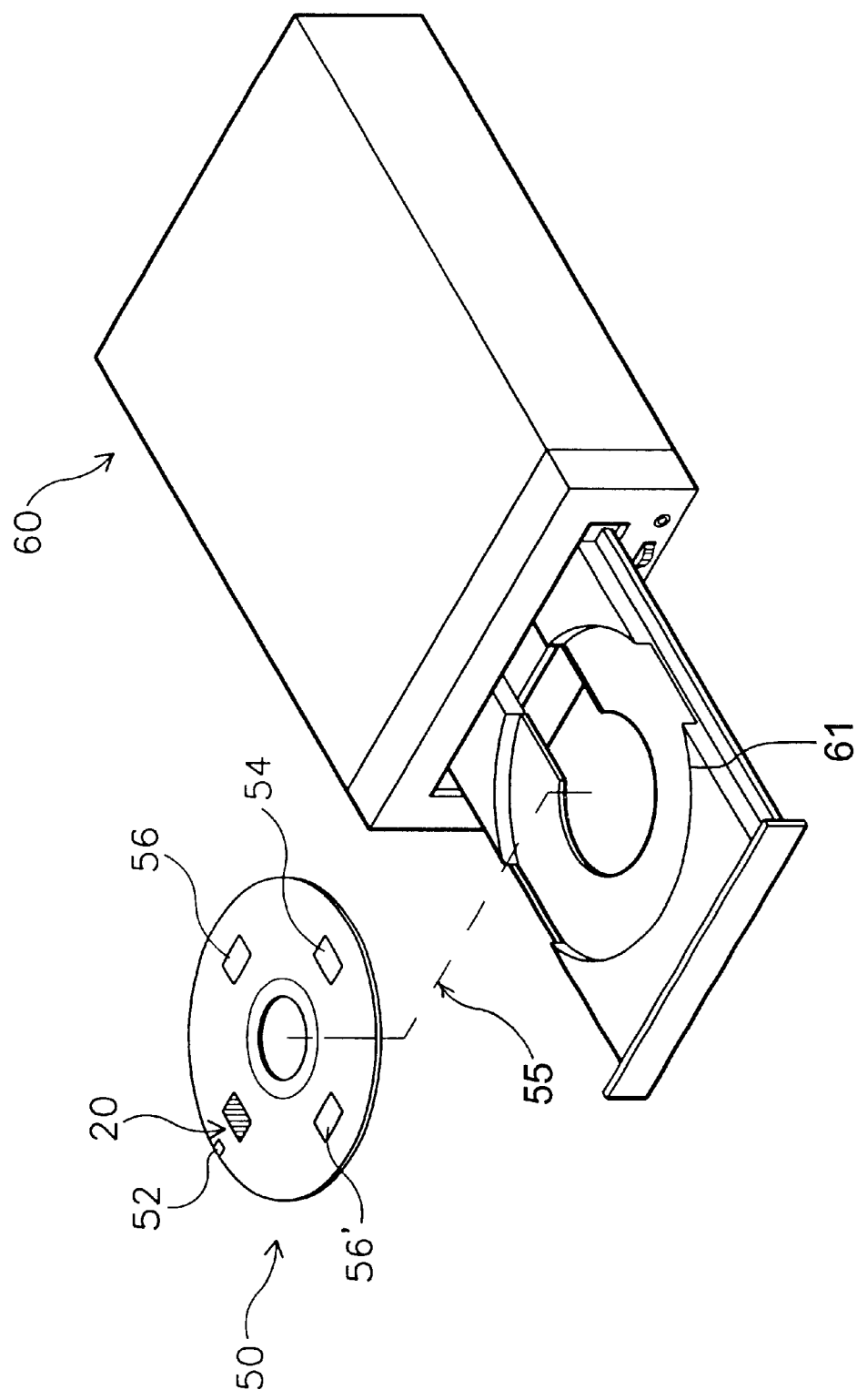
FIG. 9 is a perspective view illustrating using the optical disk unit of FIGS. 6–7.

As apparent from the above description, in accordance with the present invention, it is possible to provide an inexpensive optical disk capable of writing desired data thereon and reading the written data by providing an optical disk provided with a non-volatile memory, an optical disk unit for using such an optical disk, and a method for controlling the optical disk unit. This optical disk 50 is used in a similar manner as general optical disks, as shown in FIG. 9. FIG. 9 illustrates the optical disk unit 60 for receiving and using the optical disk 50. The dotted line 55 indicates the placing or removal of optical disk 50 in tray 61 of optical disk unit 60. The optical disk unit 60 has the optical pickup unit 64 and non-volatile memory pickup unit 70, such as illustrated in FIGS. 6 and 7.

Meanwhile, as well known in the technical field, optical disks may be used in a type loaded in a cartridge, for their protection. To such cartridge type optical disks, the present invention can also be applied. FIGS. 10a and 10b illustrate a cartridge type optical disk 50' and an optical disk unit 60' used for such a cartridge type optical disk in accordance with another embodiment of the present invention. As shown in FIGS. 10a and 10b, the cartridge type optical disk 50' is enclosed in a cartridge 90, with the cartridge 90 being positioned on tray 61' of optical disk unit 60'. In this case, at least one non-volatile memory 20' configured to enable writing of data thereon and reading of data therefrom is formed on the cartridge 90, as different from the presently described embodiment in which such a non-volatile memory is formed on the optical disk itself. The cartridge 90 is integrally formed with the optical disk 50'. Non-volatile memory 20' is preferably an EEPROM, similar to EEPROM 20 illustrated in FIGS. 2 and 3.

FIGS. 10a and 10b illustrate a perspective view of the optical disk unit 60' showing the cartridge type optical disk 50' within cartridge 90 positioned in optical disk unit 60'. FIG. 10b also illustrates a non-volatile memory pickup unit 70' having a pickup 72' positioned to contact the non-volatile memory for executing at least one of a data reading or writing operation for the non-volatile memory, EEPROM 20', and an optical pickup unit 64' for reproducing data recorded on the read only memory area of cartridge type optical disk 50'. Optical pickup unit 64' is preferably similar to optical pickup unit 64 (FIG. 6) as previously described for reading data in the read only memory area or region of cartridge type disk 50, such as by using a laser beam. Pickup 72' of non-volatile memory pickup unit 70' is similar to pickup 72, as previously described, and positioned to be electrically connected to the EEPROM 20' so that EEPROM 20' can be controlled by a control unit, similar to control unit 76 (FIG. 7) for execution of the data reading or data writing operation. A gearing unit and drive unit for pickup 72' desirably is included in non-volatile memory pickup unit 70' for bringing pickup 72' into and out of electrical contact with EEPROM 20'.

The cartridge type optical disk 50' with the non-volatile memory, such as EEPROM 20', formed on cartridge 90 can be advantageous over the optical disk 50 in that it enables a data writing or reading operation of the non-volatile memory irrespective of the operation of the optical disk itself. Furthermore, the optical disk unit adapted to use the cartridge type optical disk can eliminate the sensing unit which is required to sense the mark 52 on the optical disk 50. Accordingly, it is possible to simplify the configurations of the drive unit and gearing unit.

As apparent from the above description, in accordance with the present invention, a non-volatile memory is formed on a storage medium such as a CD-ROM or DVD-ROM. By virtue of the non-volatile memory, even when such a storage medium is recorded with a computer program requiring recording of specific information such as user information, passwords or scores of games, it is unnecessary to execute a separate setup procedure to record the information in a separate auxiliary storage unit. Accordingly, convenience in use is obtained. In addition, there is provided great convenience in managing storage media such as CD-ROMs and DVD-ROMs.

While there have been illustrated and described what are considered to be preferred embodiments of the present invention, it will be understood by those skilled in the art that various changes and modifications may be made, and equivalents may be substituted for elements thereof without departing form the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. An optical disk, comprising:

a read only memory region formed on a surface of the optical disk for recorded information, the read only memory region having a data read function;

at least one non-volatile memory formed on another surface of the optical disk opposite to the surface formed with the read only memory region, the at least one non-volatile memory having at least one of a data read function and a data write function;

at least one mark formed on the surface of the optical disk where a corresponding non-volatile memory is formed, each mark corresponding to identify a position of a corresponding non-volatile memory, each non-volatile memory being radially spaced apart from the center of the optical disk, and each mark being disposed near a peripheral edge of the optical disk so that each mark is arranged on an axis which passes through both a corresponding non-volatile memory and the center of the optical disk; and at least one dummy memory arranged on the optical disk so that a center of weight of the optical disk is positioned at a center of the optical disk when the optical disk rotates, the at least one dummy memory comprising a first dummy memory and a corresponding pair of second dummy memories, the first dummy memory and a non-volatile memory corresponding to the first dummy memory being symmetrically disposed on the optical disk with respect to an axis passing through the center of and orthogonal to the optical disk, and the corresponding pair of second dummy memories being symmetrically disposed on the optical disk with respect to an axis passing through the center of and orthogonal to the optical disk and being arranged on an axis orthogonal to an axis passing through the first dummy memory and the non-volatile memory corresponding to the first dummy memory.

2. An optical disk, comprising:

a read only memory region formed on a surface of the optical disk for recorded information, the read only memory region having a data read function;

at least one non-volatile memory formed on another surface of the optical disk opposite to the surface formed with the read only memory region, the at least one non-volatile memory having at least one of a data read function and a data write function; and at least one dummy memory arranged on the optical disk so that a center of weight of the optical disk is positioned at a center of the optical disk when the optical disk rotates, the at least one dummy memory comprising a first dummy memory and a corresponding pair of second dummy memories, the first dummy memory and a non-volatile memory corresponding to the first dummy memory being symmetrically disposed on the optical disk with respect to an axis passing through the center of and orthogonal to the optical disk, and the corresponding pair of second dummy memories being symmetrically disposed on the optical disk with respect to an axis passing through the center of and orthogonal to the optical disk and being arranged on an axis orthogonal to an axis passing through the first dummy memory and the non-volatile memory corresponding to the first dummy memory.

3. The optical disk according to claim 2, further comprised of the at least one non-volatile memory comprising an electrically erasable and programmable read only memory.

4. An optical disk, comprising:

a read only memory region formed on a surface of the optical disk for recorded information, the read only memory region having a data read function;

at least one non-volatile memory formed on another surface of the optical disk opposite to the surface formed with the read only memory region, the at least one non-volatile memory having at least one of a data read function and a data write function;

at least one mark formed on the surface of the optical disk where a corresponding non-volatile memory is formed, each mark corresponding to a non-volatile memory and serving to identify a position of a corresponding non-volatile memory; and at least one dummy memory arranged on the optical disk so that a center of weight of the optical disk is positioned at a center of the optical disk when the optical disk rotates, the at least one dummy memory comprising a first dummy memory and a corresponding pair of second dummy memories, the first dummy memory and a non-volatile memory corresponding to the first dummy memory being symmetrically disposed on the optical disk with respect to an axis passing through the center of and orthogonal to the optical disk, and the corresponding pair of second dummy memories being symmetrically disposed on the optical disk with respect to an axis passing through the center of and orthogonal to the optical disk and being arranged on an axis orthogonal to an axis passing through the first dummy memory and the non-volatile memory corresponding to the first dummy memory.

5. The optical disk according to claim 4, further comprised of the at least one non-volatile memory comprising an electrically erasable and programmable read only memory.

* * * * *